United States Patent Office 3,418,283
Patented Dec. 24, 1968

3,418,283
PROCESS FOR PREPARING POLYOXYMETHYLENE INTERPOLYMERS
Calvin N. Wolf and Murray H. Reich, Princeton, N.J., assignors to Ethyl Corporation, New York, N.Y., a corporation of Virginia
No Drawing. Filed May 28, 1964, Ser. No. 371,134
8 Claims. (Cl. 260—73)

ABSTRACT OF THE DISCLOSURE

A solution of polymerization process for preparing high melting, high molecular weight polyoxymethylethylene copolymers using as a catalyst (1) certain aryl diazonium hexafluorophoshates or (2) phosphorus pentafluoride, including complexes thereof, i.e., with esters, ethers, amines, and the like. The copolymers are prepared from trioxane and olefinically unsaturated comonomers, such as, norbornylene, vinyl chloride, vinylidene chloride, styrene, substituted styrene, butyl acrylate, cyclohexene, diallyl phthalate, butadiene, and the like.

---

This invention relates to polymeric materials, and more particularly to a method for producing a high molecular weight material by the interpolymerization of trioxane and an olefinically unsaturated comonomer.

Belgian Patent 585,980 to Farbwerke Hoechst Aktiengesellschaft discloses procedures for the preparation of polyacetals by the homopolymerization of trioxane in a bulk polymerization process in the absence or substantially in the absence of an inert solvent and in the presence of a cationic catalyst. Among the numerous compounds of the Lewis acid type disclosed as suitable catalyst in the patent are the diazonium salts of $BF_3$, $SbCl_5$, $FeCl_3$, $SnCl_4$, and $PF_5$. Examples are given in Formulae 31, 32 and 33 of diazonium hexafluorophosphates having $NO_2$, $NO_2$ and Cl, and $NO_2$ and $CH_3$ substituents of the benzene ring or rings. Example 38 describes the preparation of a homopolymer of trioxane by bulk polymerization using 4-nitrophenyldiazonium hexafluoro phosphate as the catalyst. The terminal groups of the polymers were stabilized by treatment with acetic anhydride. Then the polymer was further stabilized with 1.2% weight urea, after which treatment the polymer product had a thermal decomposition rate of 0.31% by weight per minute at 202° C.

Schneider, U.S. Patent 2,795,571, described a method for the preparation of polyoxymethylene by the homopolymerization of trioxane in a bulk polymerization process under anhydrous conditions in contact with a catalyst consisting of selected inorganic fluorides. Among the inorganic fluorides mentioned as suitable catalysts is phosphorus pentafluoride. Example 10 describes the preparation of a solid, white polymer by polymerizing trioxane utilizing phosphorus pentafluoride as the catalyst at room temperature for 5 days. A yield of only 0.67 part of polymer was obtained from 10.0 parts trioxane. The patentee prefers the use of antimony trifluoride as the catalyst on the basis that it produces polyoxymethylene of the highest quality.

It is an object of this invention to provide a process for producing an interpolymer of trioxane and an olefinically unsaturated comonomer having high molecular weight, excellent thermal stability and a high melting point.

It is a further object of this invention to provide a process for producing an interpolymer of trioxane and an olefinically unsaturated comonomer which process is carried out in solution with a particularly effective polymerization catalyst.

Other important objects and advantages of this invention will be readily apparent from the following description and claims.

In accordance with an embodiment of this invention, high molecular weight polyoxymethylene interpolymers are produced by polymerizing trioxane and an olefinically unsaturated comonomer in contact with a catalytic quantity of an aryl diazonium hexafluorophosphate.

In another embodiment of this invention, high molecular weight polyoxymethylene interpolymers are produced by polymerizing trioxane and an olefinically unsaturated comonomer in contact with a catalytic quantity of phosphorus pentafluoride.

Thus this invention utilizes as the interpolymerization catalyst phosphorus pentafluoride or a congener thereof.

Although aryl diazonium hexafluorophosphates and phosphorus pentafluoride have been used heretofore to prepare fairly unstable homopolymers from trioxane in anhydrous bulk polymerizations, it has now been discovered that these catalysts are capable of being used in solution copolymerizations of trioxane with an olefinically unsaturated comonomer to produce interpolymers having commercially attractive properties. Catalysts which are effective as initiators for homopolymerizations often are ineffective as initiators for copolymerization. Further, catalysts which are effective in a bulk polymerization often are completely ineffective when used in a solution polymerization.

That aryl diazonium hexafluorophosphates and phosphorus pentafluoride are effective catalysts for a copolymerization wherein one comonomer is olefinically unsaturated is quite unusual in view of the fact that phosphorus pentafluoride has heretofore been regarded as an ineffective catalyst for ionic polymerization of some of the commonly used olefinically unsaturated comonomers (see p. 541, "Vinyl and Related Polymers," by Calvin E. Schildknecht, John Wiley and Sons, Inc., copyright 1952). Of the Group V halides, only $SbCl_3$, $SbCl_5$ and $BiCl_3$ were reported as showing any effectivess for polymerization of isobutylene, α-methylstyrene, β-pinene and vinyl alkyl ethers.

The aryl diazonium hexafluorophosphate catalysts of this invention are characterized by being a stable, easy to handle, convenient source of phosphorus pentafluoride. One commercially available aryl diazonium hexafluorophosphate, "Phosfluorogen A" (4-chloro-phenyl diazonium hexafluorophosphate) when heated to 150° C. decomposes to form $PF_5$, $N_2$ and chlorophenyl fluoride. Since phosphorus pentafluoride is a gas boiling at −84° C., it must be handled in cylinders and introduced into the reacting mixture as a gas which creates some inconvenience. The diazonium compounds are stable solids that can be conveniently stored, handled, weighed, and introduced easily into the reacting comonomers.

The aryl diazonium hexafluorophosphate catalysts useful in the practice of this invention include those compounds wherein the aryl group may have one or more of following radicals as substituents on the aryl group: alkyl, alkenyl, cycloalkyl, aryl, alkaryl, aralkyl, halogen, nitro, sufonic acid ester, and related functional substituents which do not appreciably interfere with their ability to serve as polymerization catalysts and initiators.

Illustrative examples of the aryl diazonium hexafluorophosphates useful as catalysts in the practice of this invention are phenyldiazonium hexafluorophosphate,
4-chloro-phenyldiazonium hexafluorophosphate,
2-carbmethoxy-phenyldiazonium hexafluorophosphate,
3-carbmethoxy-phenyldiazonium hexafluorophosphate,
3-nitro-phenyldiazonium hexafluorophosphate,
4-nitro-phenyldiazonium hexafluorophosphate,
2-methyl-4-nitro-phenyldiazonium hexafluorophosphate, 2-chloro-phenyldiazonium hexafluorophosphate,
3-chloro-phenyldiazonium hexafluorophosphate,
2-chloro-5-trifluoromethyl-phenyldiazonium hexafluorophosphate,
2-ethylsulphonyl-5-trifluoromethyl-phenyldiazonium hexafluorophosphate,
2:5-dimethoxy-4-nitrilo-phenyldiazonium hexafluorophosphate,
4-diphenyldiazonium hexafluorophosphate,
2-methyl-4-cyclohexyl-phenyldiazonium hexafluorophosphate,
2,6-dimethoxy-4-phenoxyphenyldiazonium hexafluorophosphate,
2-methyl-4-(2-methylphenylazo)phenyldiazonium hexafluorophosphate,
2-chloro-4-(4'-nitrophenylazo)phenyldiazonium hexafluorophosphate,
1-anthraquinonediazonium hexafluorophosphate,
1-fluoroenyldiazonium hexafluorophosphate,
2:5-dimethoxy-4-benzoylamino-phenyldiazonium hexafluorophosphate, and
2:6-diethoxy-4-(4'-methylphenylthio)phenyldiazonium hexafluorophosphate.

Generally speaking, the aryl group in the diazonium compound will contain from about 6 carbon atoms to about 18 carbon atoms or more, although compounds containing from about 6 carbon atoms to about 14 carbon atoms in the aryl group are preferred because of cost and ready availability.

The phosphorus pentafluoride catalyst of this invention includes not only the compound in its normal gaseous state, but also its complexes with esters, ethers, sulfoxides, amines, amides, aldehydes, nitriles, ketones, thioaldehydes, thioketones, and carboxylic acid anhydrides $$RCO-O-COR'$$

where R and R' are the same or different organic radicals.

Examples of such complexing agents are ethers (diethyl ether, dibutyl ether, and other dialkyl ethers having up to about 10 carbon atoms in each alkyl group, anisole, diphenyl ether, dioxane, tetrahydrofuran, and such polyethers as ethylene glycol dialkyl ethers, and diethylene glycol dialkyl ethers in which each alkyl group contains from 1 to 10 carbon atoms, e.g., the dimethyl ether of diethylene glycol, the diethyl ether of diethylene glycol, the dibutyl ether of ethylene glycol, dimethoxy ethane, and the like) and amines (including methyl amine, dimethyl amine, trimethyl amine, ethyl amine, diethyl amine, triethyl amine, butyl amine, tributyl amine, trihexyl amine, and other aliphatic amines having alkyl groups of up to about 8 carbon atoms each, cyclohexyl amine, dicyclohexyl amine, trismethylcyclohexyl amine, triphenyl amine, tribenzyl amine, pyrrolidine, aniline, N-methyl aniline, dimethyl aniline, pyridine, toluidine, diphenyl amine, and the like). Suitable esters are ethyl formate, ethyl acetate, propyl acetate, butyl acetate, isoamyl acetate, 2-ethylhexyl acetate, octyl acetate, ethyl propionate, butyl propionate, methyl butyrate, amyl butyrate, isoamyl isovalerate, and other esters having up to about 10 carbon atoms. Appropriate sulfoxides are dimethyl sulfoxide, diethyl sulfoxide, methyl ethyl sulfoxide, methyl propyl sulfoxide, and other sulfoxides having up to about 8 carbon atoms. Some of the amides that are useful are formamide, acetamide, propionamide, butyramide, valeramide, N-ethylacetamide and othert amides having up to about 8 carbon atoms. Aldehydes such as propionaldehyde, butyraldehyde, valeraldehyde, caproaldehyde, heptaldehyde, octaldehyde, nonaldehyde, capraldehyde, undecylaldehyde, pivaldehyde, trichloroactaldehyde, and other aldehydes having up to about 15 carbon atoms are satisfactory. Among the suitable ketones are acetone, ethyl methyl ketone, diethyl ketone, isopropyl methyl ketone, methyl propyl ketone, ethyl propyl ketone, butyl methyl ketone, secbutyl methyl ketone, isobutyl methyl ketone, ethyl isopropyl ketone, tert-butyl methyl ketone and other ketones having up to about 15 carbon atoms. Suitable thioaldehydes are ethanethial, propanethial, butanethial, and other thioaldehydes containing up to about 10 carbon atoms. Among the suitable thioketones are dimethylthione, methyl ethylthione, dimethylthione, and other thioketones containing up to about 10 carbon atoms. Nitriles such as acetonitrile, propionitrile, butyronitrile, isobutyronitrile, and other nitriles containing up to about 12 carbon atoms are also suitable as complexing agents. Among the suitable carboxylic acid anhydrides are acetic anhydride, propionic anhydride, butyric anhydride, succinic anhydride, chloroacetic anhydride and other anhydrides containing up to about 20 carbon atoms.

Phosphorus pentafluoride is a somewhat milder Friedel-Crafts catalysts than is boron trifluoride. The complex formed by phosphorus pentafluoride with the ethers is unstable. It can be readily separated from ethyl ether and related oxygen derivatives which makes for convenient recovery or separation of the catalyst from polymerization products.

The phosphorus fluoride type catalyst can be used in a wide range of proportions although the optimum proportions will vary to some extent, depending upon such factors as the temperature at which the polymerization reaction is conducted, the identity and amount of olefinically unsaturated comonomer, the characteristics of the reaction diluent, the identity and characteristics of the catalyst complexing agents (if used), and the like. Generally speaking, the phosphorus-fluoride catalysts are used in proportions of from about 0.01 to about 0.50 part by weight per 100 parts of trioxane. Preferably the catalyst concentration is from about 0.05 part to about 0.40 part by weight. The most effective catalyst concentration found when using an aryl diazonium hexafluorophosphate is about 0.10 part per 100 parts of trioxane when employing about 10 parts of diluent per 100 parts of trioxane. The quantity of complexing agent, if used when using phosphorus pentafluoride, does not appear to be particularly critical. In general it should be present, however in stoichiometric equivalent quantities so as to completely complex with all of the phosphorus pentafluoride used as a catalyst. Greater or lesser quantities of the complexing agents are likewise suitable.

In the preferred embodiments of this invention the catalyst is introduced in appropriate proportions into a suitable essentially anhydrous, inert liquid polymerization medium so as thereby to provide or establish a polymerization reaction zone. If a complexing agent is to be employed it may be introduced before, during or after the introduction of the phosphorus-fluoride catalyst ingredient. In some instances the polymerization zone containing the diluent and phosphorus-fluoride catalyst, with or without complexing agent, is heated to a suitable temperature prior to the introduction therein of the trioxane and of the olefinically unsaturated comonomer. Such preheating tends to promote an activation of the catalyst system.

Suitable polymerization media (i.e., essentially anhydrous, inert reaction diluents) for use in practicing the preferred embodiments of this invention are composed of any liquid organic solvent for trioxane and for the olefinically unsaturated comonomer utilized. The chief requirements for such reaction diluent are that it be essentially anhydrous, that it possess the foregoing solvency characteristics, that it be essentially inert with respect to the phosphorus-fluoride catalyst and the monomers to be employed, and that it be in the liquid state of aggregation at the polymerization temperature and pressure selected. Among the suitable polymerization media are paraffinic hydrocarbons, cycloparaffinic hydrocarbons, aromatic hydrocarbons, naphthenic hydrocarbons, haloparaffins, halocycloparaffins, haloaromatics, halonaphthenes, nitroaromatics, aliphatic or aromatic ethers, esters, amides, nitriles, and similar materials. Specific examples of desirable solvents are cyclohexane, heptane, toluene, decahydronaphthalene, chlorobenzene, methylene dichloride, tetrachloroethylene, cis-1,2-dichloroethylene, and trans-1,2-dichloroethylene. One of the preferred solvents is cis-1,2-dichloroethylene.

The quantity of diluent employed may range from about 1.0 part to about 25 parts by weight per 100 parts trioxane, preferably from about 4 to about 14 parts by weight per 100 parts trioxane. A still more preferable quantity of diluent suitable for use in the process of the present invention is 10 parts by weight per 100 parts trioxane.

The reaction temperature and pressure are not critical since room temperature and atmospheric pressure are operable in this process as well as high temperatures or low temperatures at subatmospheric or superatmospheric pressures. In order to avoid loss of either comonomer or catalyst, it is preferred to operate at slightly above atmospheric pressure. A preferred pressure range is from about 2 to about 25 p.s.i.g. One can employ temperatures of about 0° to about 75° C., although broader limits of temperature may be from about −80° C. to +100° C. A preferred temperature is about 55° C.

Besides maintaining an essentially anhydrous atmosphere within the reaction zone, it is desirable to cover the reactants with a blanket of dry, inert gas so as to obviate both the introduction of excessive moisture and the occurrence of an undesirable amount of oxidative deterioration of the catalyst.

The time required for the polymerization reaction will vary in relation to the type and amount of the phosphorus-fluoride catalyst employed, and the polymerization conditions under which the operation is conducted. Thus, in batch type operations the trioxane and the ethylenically unsaturated comonomer are maintained in contact with the catalyst for a period of time sufficient to effect the formation or the desired high molecular weight polyoxymethylene-based polymeric product. In most instances the polymerization reactions initiate quite promptly and are substantially complete within one-half to about 50 hours. When relatively low quantities of the liquid diluent is used (1.0 to about 10.0 parts by weight based on 100 parts trioxane) the entire reaction system will often solidify at the end of the polymerization period. Comparable or somewhat shorter reaction periods (i.e., residence times) may be used when conducting the polymerizations of this invention on a continuous or semicontinuous basis.

Conventional work-up procedures may be used, such as washing the isolated polymeric product with suitable inert solvents to remove catalyst residues. A preferred treatment for removing catalyst residues is to break the solid copolymer into small pieces and to treat the crushed copolymer with refluxing methanol for about one hour followed by treatment with refluxing dilute aqueous ammonia for about one-half to one hour. Thereupon the resultant high molecular weight polyoxymethylene-based polymer may be subjected to such after treatments as "end-capping" (e.g., U.S. Patent 2,964,500) or may be associated with stabilizing additives (e.g., U.S. Patents 2,810,708, 2,871,220, 2,893,972, 2,920,059, 2,936,298) in order to further improve upon the suitability of the polymer for subsequent operations such as molding, extrusion, and like procedures for preparing finished articles therefrom.

A wide variety of olefinically unsaturated comonomers may be used in practicing this invention.

Suitable olefinic type comonomers include:

(1) Vinyl ether comonomers having the formula $$CH_2=CH-O-Y$$

wherein Y is a monovalent radical selected from the group consisting of alkyls of 1–8 carbon atoms, alkenyls of 1–8 carbon atoms, cycloalkyls of 4–6 carbon atoms, cycloalkenyl of 4–6 carbon atoms, and the radicals and $$-(R_2O)_nR_1$$

$$-R_2\overset{O}{\overset{\|}{C}}OR_1$$

wherein $n$ is any positive integer from 1–7, $R_1$ is an alkyl radical of 1–7 carbon atoms, and $R_2$ is a saturated, bivalent, acyclic hydrocarbon radical of 1–7 carbon atoms, the total number of carbon atoms in $R_1$ and $R_2$ being not greater than about 8. Numerous examples of such vinyl ethers are presented in U.S. Patent 3,076,786.

(2) Functionally substituted alpha monoolefinic monomers having the formula $$CH_2=X$$

wherein X is a carbon atom substituted with from 1 to 2 halogen atoms, or is a hydrocarbon group (having from 1 to about 30 carbon atoms) which is substituted with a nitrile group, an ester function, 1 or more halogen atoms, or the like. Typical of these monomers are the vinyl esters (e.g., acrylates, methacrylates), acroleins, acrylic acids, acrylonitrile (and the higher homologs thereof), vinyl halides, (and the higher homologs thereof), alpha olefinic ketones, and the like. Examples of these materials include vinyl acetate, vinyl chloride; vinyl bromide, vinylidene chloride, acrolein, methyl acrolein, butyl acrylate, methyl methacrylate, acrylonitrile, vinyl methyl ketone, allyl bromide, and the like. Therefore, in the formula above X may be further defined as a hydrocarbon group containing up to about 30 carbon atoms and having a functionally substituted group thereon, the functional group including halides, ketone groups, aldehyde groups, nitrile groups, carboxylic acid groups, ester groups, amino groups, and the like.

(3) Styrene monomers having the formula $$H_2C=CHR$$

wherein R is an aromatic or functionally substituted aromatic group having from 6 to about 16 carbon atoms. Generally speaking, there are 3 particular types of such styrenes which are especially suitable for this use. One such type is styrene and alkylated styrenes in which the phenyl group of the styrene molecule is substituted with from 1 to 3 alkyl groups, the total number of alkyl carbon atoms being up to about 10. In this group of hydrocarbon styrene compounds it is preferable that there be no more than about 2 carbon atoms attached to the positions ortho to the vinyl group. Typical of these materials are styrene, O-methyl styrene, o-ethyl styrene, 2,6-dimethyl styrene, metaisopropyl styrene, p-t-butyl styrene, 3,5-diethyl styrene, 2-methyl-5-sec-butyl styrene, p-1,1,3,3-tetramethyl butyl styrene, 2,5-dimethyl-4-(2-octyl) styrene, and the like. The second type is the halostyrenes—styrene in which the ring is substituted with up to 3 halogen atoms. Exemplary of these compounds are p-chlorostyrene, o-fluorostyrene, metabromostyrene, 2,5-dichlorostyrene, 2,4,6-trichlorostyrene, and the like. The third type of mononuclear styrene compounds is made up of combined aklylated/halogenated styrene materials. In this instance the compound contains up to about 3 halogen atoms which may be substituted directly in the available positions in the nucleus, or in the alkyl side chains, or in both. In addition, the ring is substituted with up to about 3 alkyl groups, the total number of carbon atoms of which is up to about 10. Exemplary of these substituted styrenes are 4-trifluoromethyl styrene, 4 - chloro-2,5 - dimethyl styrene, 2,6,4 - (1,1,2 - trimethyl propyl)styrene, 3,5-dichloro-2,4,6-trimethyl styrene, 2-bromo-5-chloro-4-ethyl styrene, and the like. In all instances the halogen atoms when present in these styrene compounds preferably have an atomic number of up to and including 35, i.e., the most desirable halogens which may be substituted in these compounds are fluorine, chlorine and/or bromine. Corresponding polynuclear styrenes (e.g., vinyl naphthalene) are also suitable.

(4) Alpha- and/or beta-substituted styrene monomers having the formula $$RR'C=CR''R'''$$

wherein R, R' and R'' are hydrogens, alkyl groups of 1 to 4 carbon atoms, halogens, cyano groups, amino groups, and the like; and R''' is an aromatic group or functionally substituted aromatic group. Typical of such substituted styrene comonomers are α-chloro styrene, α-cyano styrene, β-cyano styrene, 4-α-dichloro styrene, 3,4-dimethyl-α-bromo styrene, α-methyl styrene, α-methyl-4-bromo styrene, α-methyl-3-bromo-4-methyl styrene, α-methyl-3-chloro styrene, α-methyl-4-chloro styrene, α-methyl-3-chloro-4-methyl styrene, α-methyl-3,5-dibromo styrene, α-methyl-3,4-dichloro styrene, α-methyl-3,5-dichloro styrene, α-methyl-3,4-dimethyl styrene, α-methyl-4-ethoxy styrene, 2-methyl-2-fluoro styrene, α-methyl-4-methoxy styrene, α-methyl methyl styrene, α-methyl-2-methyl-3-chloro styrene, α-methyl-4-isopropyl styrene, α-methyl trifluoromethyl styrene, α-methyl-3-trifluoromethyl-4-fluoro styrene, α-methyl-3,4-methylenedioxy styrene, α-methyl pentachloro styrene, α-methyl-4-phenoxy styrene, α-methyl-3-phenyl styrene, α-methyl-4-phenyl styrene α-methyl-4-isopropyl styrene, α-methyl-2-propyl-5-methoxy styrene, α-methyl tetrachloro styrene, α-methyl trichloro styrene, α-methyl-3-trifluoromethyl styrene, α-methyl-3-trifluoromethyl-4-bromo styrene, α-methyl-2-trifluoromethyl-4-fluoro styrene, and the like.

(5) Olefinically unsaturated terpene compounds, such as α-pinene, β-pinene, myrcene, ocimene, alloocimene, carvomenthene, α-terpinene, α-phellandrene, β-phellandrene, α-thujene, sabinene, and the like.

(6) Cycloolefins and cyclic polyolefins, such as cyclohexene, cycloheptene, cyclooctene, cyclopentadiene, the cyclohexadienes, the cycloheptadienes, the cyclooctadienes, cycloheptatriene, as well as the alkylated derivatives of these cyclic compounds, especially where the alkyl groups each contain from 1 up to about 8 carbon atoms and are positioned on the ring on a carbon atom other than a carbon atom carying a double bond (e.g., 4-methyl cyclohexene-1, 3-butyl cyclohexene-1, 3,4-dimethyl cyclohexene-1, etc.). Halogen atoms and other similar functional groups may likewise be present in these cycloolefins and cyclic polyolefins.

(7) Dihydrocarbyl esters of an organic carboxylic acid, especially those having the formula $$R_1O-\overset{O}{\underset{\|}{C}}-R-\overset{O}{\underset{\|}{C}}-OR_2$$

wherein $R_1$ and $R_2$ are organo groups (preferably hydrocarbyl groups) each having from 1 to about 18 carbon atoms, and R is a divalent hydrocarbon radical having from 1 to about 12 carbon atoms (preferably from 2 to about 8 carbon atoms), at least one of R, $R_1$ and $R_2$ possessin golefinic unsaturation. Typical examples of these esters are diethyl maleate, dibutyl maleate, diallyl phthalate, diallyl itaconate, dibutyl fumarate, divinyl succinate, diallyl maleate, dimethyl fumarate, dimethyl maleate, dimethyl itaconate, diallyl adipate, and the like.

(8) Diene monomers having the formula $$R''=R'=R$$

wherein each R, R' and R'' are hydrocarbon groups containing from about 1 to about 18 carbon atoms. The diene monomer having the formula above generally contains a total of from about 4 to about 30 carbon atoms in the molecule. The diene monomer may be conjugated or nonconjugated. Exemplary of these materials are isoprene, 4-vinyl cyclohexene-1, 2,5-hexadiene, 1,3-butadiene, squalene, allene, 1,2-butadiene, 2,3-dimethyl butadiene, diallyl, 1,3-pentadiene, 1,4-heptadiene, 1,5-hexadiene, 1,6-octadiene, 4-vinyl cyclohexadiene-1,5, and the like.

While various olefinically unsaturated comonomers containing up to about 30 or so carbon atoms in the molecule may be employed, it is generally more desirable to utilize comonomers having up to about 20 carbon atoms in the molecule as these tend to copolymerize more readily with the trioxane. Preferably, the olefinic type comonomer contains up to about 12 carbon atoms in the molecule, the particularly preferred materials containing up to about 8 carbon atoms.

Of the foregoing comonomers best results are generally achieved by employing the styrene monomers identified above as item 3. Consequently the use of styrene-type comonomers is preferred. Also the most stable interpolymers are generally made from olefinically unsaturated hydrocarbons, i.e., compounds composed solely of carbon and hydrogen.

Another very desirable and preferred type of comonomer for use in the process of this invention is composed of the alpha monoolefins having the formula $$CH_2=CHR$$

wherein R is selected from the group consisting of hydrogen and an alkyl group having from 1 to about 30 carbon atoms. It will be noted from this formula that these alpha olelnic hydrocarbons have no branch closer to the double bond than the three position. Of these alpha olefinic hydrocarbons those which contain 2 to about 20 carbon atoms in the molecule are preferred, those containing from 2 to about 12 carbon atoms in the molecule being particularly preferred. In general, the best results from this class of comonomers are achieved when utilizing alpha olefinic hydrocarbons of the above formula which contain from 3 to about 8 carbon atoms in the molecule. On the basis of availability and cost, the straight chain alpha olefinic hydrocarbons are especially suitable. Examples of these alpha olefinic hydrocarbons include ethylene, propylene, butene-1, pentene-1, hexene-1, heptene-1, octene-1, nonene-1, decene-1, undecene-1, dodecene-1, tetradecene-1, octadecene-1, 4-methyl pentene-1, 3-methyl octene-1, 3-butyl-4-hexyl heptene-1, 7-methyl nonene-1, 4,5-dimethyl heptene-1, triconene-1, and the like.

An outstanding comonomer for use in the practice of this invention is norbornylene. The copolymers prepared therefrom are characterized by possessing noteworthy chemical and thermal stabilities even prior to the incorporation therein of stabilizer additives. Accordingly, the practice of this invention utilizing norbornylene constitutes a particularly preferred embodiment.

Interpolymers made from trioxane along with 2 or more of the foregoing comonomers may be made by the process of this invention.

The proportions of trioxane and the olefinically unsaturated comonomer may be varied over a reasonably wide range, although in general it is desirable that the amount of the olefinically, unsaturated comonomer range from about 0.1 to about 20 parts by weight based on 100 parts by weight of trioxane. In most instances it is preferably that the olefinically unsaturated comonomers be used in an amount equivalent to from about 0.5 to about 6 parts by weight relative to 100 parts by weight trioxane, the most particularly preferred proportions ranging from about 2.0 to about 4 parts by weight per 100 parts by weight of trioxane. The foregoing minor amounts of the olefinically unsaturated comonomer beneficially modifies the chemical and physical characteristics of the basic polyoxymethylene chain and thereby provide a polymeric material which is generally suitable for use in applications for which previously known polyoxymethylene polymers were suited.

This invention will be still further apparent by reference to the specific examples. All references to "parts" in the following exampes are parts by weight.

EXAMPLE I 10 parts of cis-1,2-dichloroethylene was placed in an 8-ounce bottle and 100 parts of s-trioxane was added. 4.0 parts of norbornylene and 0.20 part 4-chloro-phenyldiazonium hexafluorophosphate were added to the bottle.

The bottle was placed under 15 lb./sq. in. nitrogen pressure and maintained at 55° C. for 17 hours at which time the reactants had solidified. The copolymer product was obtained in a conversion of 65.6 percent based on the weight of comonomers used. The solid copolymer product was crushed and then treated to remove the catalyst with refluxing methanol for one hour followed by treatment with refluxing aqueous ammonia for one hour. The treated product was then dried in a vacuum oven. The treated copolymer had a polymer melting temperature of 158° C., a crystalline melting point of 140° C., and an inherent viscosity of 0.79. The thermal stability of the copolymer was determined by subjecting an unstabilized sample of the copolymer exposed in air to a temperature of 222° C. After one hour the unstabilized sample retained 84.9 percent of its original weight.

EXAMPLE II

The procedure of Example I was repeated with the exception that 14 parts of cis-1,2-dichloroethylene was used for the polymerization medium and 3.0 parts of norbornylene was used. The polymerization produced a solid copolymer product in 16 hours at a conversion of 59.7 percent based on the total weight of the comonomers. The copolymer had a polymer melting temperature of 158° C., a crystalline melting point of 147° C. and an inherent viscosity of 0.78. Thermal stability for the unstabilized sample was 84.2 percent weight retention.

EXAMPLE III

The procedure of Example I was repeated with the exception that 0.12 part 4-chloro-phenyldiazonium hexafluorophosphate was used as the catalyst and 3.0 part of norbornylene comonomer was used. Comonomer conversion to copolymer was 60.3 percent. The copolymer had a polymer melting temperature of 162° C., a crystalline melting point of 147° C. and an inherent viscosity of 0.93. Thermal stability was 85.5 percent weight retention for the unstabilized sample.

EXAMPLE IV

The procedure of Example I was repeated with the exception that 0.10 part 4-chloro-phenyldiazonium hexafluorophosphate was used as the catalyst. Also, 3.9 parts of cis-1,2-dichloroethylene and 3.0 parts of norbornylene were used. After 16.5 hours the conversion of comonomers to copolymer was 62.5 percent. The copolymer had a polymer melting temperature of 158° C., a crystalline melting point of 145° C. and an inherent viscosity of 0.83. The polymerization temperature was 58° C. Thermal stability was 87.5 percent weight retention for the unstabilized sample.

EXAMPLE V

The procedure of Example I was repeated with the exception that 10 parts of tetrachloroethylene was used for the polymerization medium and 3.0 parts of norbornylene was used. Only 0.06 part of 4-chloro-phenyldiazonium hexafluorophosphate was used for the catalyst. After 40 hours reaction time the copolymer was obtained in a 36.4 percent conversion of the comonomers. The copolymer had a polymer melting temperature of 157° C., a crystalline melting point of 144° C. and an inherent viscosity of 0.84. The copolymer had a thermal stability of 83.0 percent weight retention for the unstabilized sample.

EXAMPLE VI

The procedure of Example I was repeated with the exception that 10 parts of cyclohexane was used for the polymerization medium and 3.0 parts norbornylene was used. 0.10 part 4-chlorophenyldiazonium hexafluorophosphate was used as the catalyst. After 42 hours reaction time the total comonomer conversion was 37.9 percent. The copolymer had a polymer melting temperature of 157° C., a crystalline melting point of 144° C. and an inherent viscosity of 0.74. The copolymer had a thermal stability of 74.9 percent weight retention for the unstabilized sample.

EXAMPLE VII

The procedure of Example I was repeated with the exception that 10 parts of tetrachloroethylene was used as the polymerization medium and 3.0 parts of norbornylene was used. 0.10 part of 4-chloro-phenyldiazonium hexafluorophosphate was used for the catalyst. After 17 hours polymerization the total comonomer conversion to copolymer was 38.6 percent. The copolymer had a polymer melting temperature of 158° C., a crystalline melting point of 146° C. and an inherent viscosity of 0.69. The copolymer had a thermal stability of 84.5 percent weight retention for the unstabilized sample.

EXAMPLE VIII

The procedure of Example I was repeated with the exception that 2.0 parts of norbornylene was used as comonomer and 0.10 part of 4-chloro-phenyldiazonium hexafluorophosphate was used for the catalyst. After 21 hours the total comonomer conversion to copolymer was 53.0 percent. The copolymer had a polymer melting temperature of 168° C., a crystalline melting point of 145° C. and an inherent viscosity of 0.97. The copolymer had a thermal stability of 82.4 percent weight retention for the unstabilized sample.

EXAMPLE IX

The procedure of Example I was repeated with the exception that 2.0 parts of norbornylene was used as comonomer and 0.12 part of 4-chloro-phenyldiazonium hexafluorophosphate was used for the catalyst. After 19 hours the total comonomer conversion to copolymer was 64.5 percent. The copolymer had a polymer melting temperature of 147° C., a crystalline melting point of 145° C. and an inherent viscosity of 1.19. The copolymer had a thermal stability of 79.5 percent weight retention for the unstabilized sample.

EXAMPLE X

The procedure of Example I was repeated with the exception that 2.0 parts of norbornylene was used. The copolymer product was obtained in a conversion of 44.5 percent of the total weight of the comonomers. The copolymer had a polymer melting temperature of 162° C., a crystalline melting point of 147° C. and an inherent viscosity of 0.74. Thermal stability for an unstabilized sample was 66.9 percent weight retention.

EXAMPLE XI

The procedure of Example I was repeated with the exception that 2.5 parts of norbornylene was used. The reactants solidified in 16 hours and the conversion of comonomers to copolymer was 61.0 percent. The copolymer had a polymer melting temperature of 162° C., a crystalline melting point of 146° C. and an inherent viscosity of 0.82. Thermal stability for an unstabilized sample was 74.8 percent weight retention.

EXAMPLE XII

The procedure of Example I was repeated with the exception that 0.08 part of 4-chloro-phenyldiazonium hexafluorophosphate was used as the catalyst and 3.0 parts of norbornylene comonomer was used. 10 parts of tetrachloroethylene were used for the diluent. The mixture solidified within 17 hours and was removed from the 55° C. bath at the end of 42 hours. Comonomer conversion to copolymer was 37.5 percent. The copolymer had a polymer melting temperature of 157° C., a crystalline melting temperature of 145° C. and an inherent viscosity of 0.77. Thermal stability for an unstabilized sample was 88.4 percent weight retention.

EXAMPLE XIII

The procedure of Example I was repeated with the exception that 0.14 part of 4-chloro-phenyldiazonium hexafluorophosphate was used as the catalyst and 2.0 parts of norbornylene comonomer was used. The mixture solidified in 19 hours and the conversion of comonomers to copolymer was 60.3 percent. The copolymer had a polymer melting temperature of 162° C., a crystalline melting temperature of 144° C. and an inherent viscosity of 0.89. Thermal stability for an unstabilized sample was 78.2 percent weight retention.

EXAMPLE XIV

The procedure of Example I was repeated with the exception that 3.0 parts of styrene in place of norbornylene, 10 cc.'s of phosphorus pentafluoride was used as the catalyst, and 10 parts of tetrachloroethylene was used for the polymerization medium. After 10 minutes of reaction time the coplymer was obtained in a 26.2 percent conversion of the comonomers. The copolymer had a polymer melting temperature of 172° C., a crystalline melting point of 144° C. and an inherent viscosity of 1.30. The copolymer had a thermal stability of 56.5 percent weight retention for the unstabilized sample.

EXAMPLE XV

The procedure of Example I was repeated with the exception that 3.0 parts of hexene-1 was used as a comonomer in place of norbornylene, 10 cc.'s of phosphorus pentafluoride was used as the catalyst, and 10 parts of tetrachloroethylene was used for the polymerization medium. After 50 minutes of reaction time the copolymer was obtained in a 31.0 percent conversion of the comonomers. The copolymer had a polymer melting temperature of 165° C., a crystalline melting point of 151° C. and an inherent viscosity of 0.31. The copolymer had a thermal stability of 38.3 percent weight retention for the unstabilized sample.

EXAMPLE XVI

The procedure of Example I was repeated with the exception that 20 cc.'s of phosphorus pentafluoride was used as the catalyst, 1.0 part of norbornylene was used, and 14 parts of tetrachloroethylene was used for the polymerization medium. After 5 minutes of reaction time the copolymer was obtained in a 57.5 percent conversion of the comonomers. The copolymer had a polymer melting temperature of 167° C., a crystalline melting point of 152° C. and an inherent viscosity of 1.24. The copolymer had a thermal stability of 72.8 percent weight retention for the unstabilized sample.

As mentioned hereinbefore it is common practice to incorporate chemical stabilizing agents into polyacetals to further improve the thermal stability of the polymers over that obtained by "end capping" with compounds that react with the hydroxyl groups on the end of the oxymethylene chains, or interpolymerizing the polyacetal with comonomers that also enter the oxymethylene chain. Diphenylamine has been found to be a very effective chemical stabilizing agent for polyacetals. Separate samples of the copolymers produced in Examples I through IX and XIV through XVI were compounded with 5 parts by weight diphenylamine per 100 parts by weight copolymer and the thermal stability of the chemically stabilized samples was determined using the technique employed in the tests of the unstabilized sample of Example I. The percent weight retention at the end of one hour and at the end of two hours was determined and the weight loss in percent per minute was calculated for these chemically stabilized samples. The results are shown in the following table.

THERMAL STABILITY PROPERTIES OF COPOLYMERS OF TRIOXANE AND OLEFINICALLY UNSATURATED COMONOMER CHEMICALLY STABILIZED WITH DIPHENYLAMINE

| Polymer of Example No. | Thermal Stability at 222° C. | | |
|---|---|---|---|
| | Percent Weight Retention | | Percent/Minute Weight Loss |
| | 1 Hour | 2 Hours | |
| I | 76.4 | 57.7 | 0.31 |
| II | 73.0 | 63.8 | 0.15 |
| III | 81.6 | 77.8 | 0.06 |
| IV | 81.3 | 70.7 | 0.18 |
| V | 92.0 | 86.4 | 0.09 |
| VI | 85.5 | 74.1 | 0.19 |
| VII | 91.0 | 81.0 | 0.17 |
| VIII | 76.2 | 64.4 | 0.20 |
| IX | 74.8 | 64.6 | 0.17 |
| XIV | 56.7 | 43.2 | 0.22 |
| XV | 52.8 | 47.6 | 0.09 |
| XVI | 81.7 | 71.4 | 0.17 |

COMPARATIVE EXAMPLES

A series of solution homopolymerizations of trioxane was conducted using different levels of concentration of an aryl diazonium hexafluorophosphate as the catalyst to determine the comparative effectiveness of these catalysts in solution homopolymerization reactions.

Example A 50 parts of cis-1,2-dichloroethylene was placed in an 8-ounce bottle and 100 parts of trioxane was added. 0.60 part of 4-chloro-phenyldiazonium hexafluorophosphate was added. The bottle was placed under 15 lb./sq. in. nitrogen pressure and maintained at 55° C. for 17 hours at which time the homopolymer solidified. Conversion of the trioxane to homopolymer was 8.4 percent. The homopolymer had a polymer melting temperature of 170° C., a crystalline melting point of 151° C., and an inherent viscosity of 0.43. An unstabilized sample of the homopolymer was subjected to a thermal stability test by exposure in air to a temperature of 222° C. The sample had a weight retention of 0.7 percent of its original weight at the end of one hour.

Example B

The procedure of Example A was repeated with the exception that 10 parts of cis-1,2-dichloroethylene was used for the polymerization medium and 0.40 part of 4-chloro-phenyldiazonium hexafluorophosphate was added. The homopolymer solidified in 17 hours and the trioxane conversion to homopolymer was 82.2 percent. The homopolymer had a polymer melting temperature of 177° C., a crystalline melting point of 155° C. and an inherent viscosity of 0.52. An unstabilized sample had a weight retention of 2.0 percent of its original weight at the end of one hour at 222° C.

Example C

The procedure of Example A was repeated with the exception that 10 parts of cis-1,2-dichloroethylene was used for the polymerization medium and 0.20 part of 4-chloro-phenyldiazonium hexafluorophosphate was added. The homopolymer solidified in 18 hours and the trioxane conversion was 82.2 percent. The homopolymer had a polymer melting point of 178° C., a crystalline melting point of 148° C. and an inherent viscosity of 0.89. An unstabilized sample had a weight retention of 3.8 percent of its original weight at the end of one hour at 222° C.

Example D

The procedure of Example A was repeated with the execption that 10 parts of cis-1,2-dichloroethylene was used for polymerization medium and 0.10 part of 4-chloro-phenyldiazonium hexafluorophosphate was added. The homopolymer solidified in 17 hours and the trioxane conversion was 52.8 percent. The homopolymer had a polymer melting point of 178° C., a crystalline melting point of 150° C. and an inherent viscosity of 1.06. An unstabilized sample had a weight retention of 12.4 percent of its original weight at the end of one hour at 222° C.

Example E

The procedure of Example A was repeated with the exception that 55 parts of tetrachloroethylene was used as the polymerization medium and 10 cc.'s of phosphorus-pentafluoride was used as the catalyst. After 10 hours reaction time 14.0 percent of the trioxane had been converted to homopolymer. The homopolymer had a polymer melting temperature of 167° C., a crystalline melting point of 152° C., and an inherent viscosity of 1.24. An unstabilized sample had a weight retention of 0.9 percent of its orginial weight at the end of one hour at 222° C.

Example F

The procedure of Example A was repeated with the exception that 100 parts of tetrachloroethylene was used as the polymerization medium and 10 cc.'s of phosphorus pentafluoride was used as the catalyst. After 72 hours of reaction time 34.0 percent of the trioxane had been converted to homopolymer. The homopolymer had a polymer melting temperature of 179° C., a crystalline melting point of 154° C., and an inherent viscosity of 1.33. An unstabilized sample had a weight retention of 0.3 percent of its original weight at the end of one hour at 222° C.

From a comparison of the thermal stabilities of the foregoing homopolymers of trioxane with the thermal stabilities of the copolymers of Examples I–XVI, produced according to the process of the present invention, it is evident the copolymers possess an unexpectedly superior thermal stability. The phosphorus-fluoride type catalysts of the present invention are thus seen to be especially effective for solution copolymerization of trioxane with olefinically unsaturated comonomers, whereas these catalysts are relatively poor catalysts for solution homopolymerization of trioxane, particularly from the standpoint of the poor thermal stability of the homopolymer produced.

The inherent viscosity of the copolymers reported in the foregoing examples was determined using 0.2% weight of the copolymer in parachlorophenol.

The procedure for determining polymer melting temperature and crystalline melting point is described on pages 45–50 of "Preparative Methods of Polymer Chemistry," Soreson and Campbell, Inter-Science Publishers.

The polyoxymethylene interpolymers produced by the process of this invention are useful in the preparation of molded or extruded shapes, articles, fibers, filaments, films, sheets, rods, tubes, pipes, and other articles. Thus the interpolymers formed pursuant to this invention can be put to most, if not all, uses for which high molecular weight polyoxymethylene homopolymers are suited. Certain types of polyoxymethylenes made from the comonomers described herein are soluble in the common organic solvents. This class of copolymers may be used in solution as a coating material and as a component of finishes. The high molecular weight, heat resistant copolymers of this invention may be modified for particular uses by addition of antioxidants, fillers, pigments, and the like.

We claim:
1. In a process for the copolymerization of trioxane with an olefinically unsaturated comonomer in the presence of a polymerization catalyst, the improvement which comprises contacting the comonomers in an anhydrous, inert liquid polymerization medium in the presence of a catalyst selected from the group consisting of phosphorus pentafluoride and an aryl diazonium hexafluorophosphate, the amount of catalyst present in the copolymerization system being in the range of from about 0.01 to about 0.50 part, per 100 parts of trioxane.

2. The process of claim 1 wherein the copolymerization is conducted at a temperature of from about −80° C. to about 100° C. at superatmospheric pressure.

3. The process of claim 1 wherein the catalyst is phosphorus pentafluoride.

4. The process of claim 1 wherein the catalyst is an aryl diazonium hexafluorophosphate.

5. The process of claim 4 wherein the aryl diazonium hexafluorophosphate is 4-chloro-phenyl diazonium hexafluorophosphate.

6. In a process for the copolymerization of trioxane with an olefinically unsaturated comonomer selected from the group consisting of norbornylene, styrene, and hexene-,1 in the presence of a polymerization catalyst, the improvement which comprises contacting the comonomers in the presence of a catalyst selected from the group consisting of phosphorus pentafluoride, and an aryl diozonium hexafluorophosphate, the amount of catalyst present in the copolymerization system being in the range of from about 0.01 to about 0.50 part, per 100 parts of trioxane.

7. The process of claim 6 wherein the olefinically unsaturated comonomer is norbornylene.

8. The process of claim 6 wherein the olefinically unsaturated comonomer is styrene.

References Cited
UNITED STATES PATENTS

| | | | |
|---|---|---|---|
| 2,795,571 | 6/1957 | Schneider | 260—67 |
| 3,256,246 | 6/1966 | Gutweiler | 260—67 |
| 3,296,210 | 1/1967 | Wilson et al. | 260—73 |
| 3,316,217 | 4/1967 | Weissermel et al. | 260—67 |

WILLIAM H. SHORT, *Primary Examiner.*

L. M. PHYNES, *Assistant Examiner.*

U.S. Cl. X.R.

260—64, 67